US010349345B2

(12) United States Patent
Drevö et al.

(10) Patent No.: US 10,349,345 B2
(45) Date of Patent: Jul. 9, 2019

(54) METHOD OF CONTROLLING BOOSTER CELL ENERGY CONSUMPTION

(71) Applicant: Telefonaktiebolaget LM Ericsson (publ), Stockholm (SE)

(72) Inventors: Markus Drevö, Linköping (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/126,650

(22) PCT Filed: Mar. 17, 2015

(86) PCT No.: PCT/SE2015/050304
§ 371 (c)(1),
(2) Date: Sep. 16, 2016

(87) PCT Pub. No.: WO2015/142264
PCT Pub. Date: Sep. 24, 2015

(65) Prior Publication Data
US 2017/0078960 A1 Mar. 16, 2017

Related U.S. Application Data

(60) Provisional application No. 61/968,110, filed on Mar. 20, 2014.

(51) Int. Cl.
*H04W 52/02* (2009.01)
*H04W 52/26* (2009.01)
(Continued)

(52) U.S. Cl.
CPC ..... *H04W 52/0206* (2013.01); *H04W 36/165* (2013.01); *H04W 52/267* (2013.01);
(Continued)

(58) Field of Classification Search
CPC ............. H04W 88/06; H04W 52/0216; H04W 52/0206
See application file for complete search history.

(56) References Cited

U.S. PATENT DOCUMENTS 9,363,718 B2 * 6/2016 Lee ................... H04W 36/0061
2010/0151870 A1 * 6/2010 Piercy ................ H04W 52/241
455/450

(Continued)

OTHER PUBLICATIONS

Prasad et al., Energy Efficient Small Cell Activation Mechanism for Heterogeneous Networks, 2013, IEEE Globecom 2013 Workshop-Heterogeneous and Small Cell Networks, pp. 754-759.*
(Continued)

*Primary Examiner* — Said M Elnoubi
(74) *Attorney, Agent, or Firm* — Baker Botts, LLP (57) ABSTRACT

The present disclosure relates to a booster radio base station, booster RBS, defining a booster cell in a multilayer cell structure and a method, performed in a booster RBS, of controlling energy consumption. The method comprises a step of receiving (S21) information from a macro RBS, defining a basic coverage providing macro cell, the information indicating a first power required to provide service to one or more wireless devices being served in an area at least in part overlapping the booster cell. The method also comprises the further steps of determining (S23) a macro bitrate power measure based on the received information, the macro bitrate power measure reflecting a service provisioning of the one or more wireless devices from the macro RBS and determining (S25) a booster bitrate power measure, the booster bitrate power measure reflecting a service provisioning of the one or more wireless devices from the booster RBS. An energy consumption state is selected (S27) from two or more energy consumption states for the booster RBS based on a comparison between the booster bitrate power
(Continued)

measure and the macro bitrate power measure. The disclosure relates to a method, performed in a macro radio base station, macro RBS, defining a basic coverage providing macro cell, of controlling energy consumption of a booster radio base station. The disclosure also relates to a macro radio base station.

18 Claims, 4 Drawing Sheets

(51) Int. Cl.
    *H04W 52/34*     (2009.01)
    *H04W 36/16*     (2009.01)
    *H04W 52/36*     (2009.01)

(52) U.S. Cl.
    CPC ........ *H04W 52/343* (2013.01); *H04W 52/365* (2013.01); *Y02D 70/00* (2018.01); *Y02D 70/1226* (2018.01); *Y02D 70/1242* (2018.01); *Y02D 70/1262* (2018.01)

(56) References Cited

U.S. PATENT DOCUMENTS

| | | | | |
|---|---|---|---|---|
| 2012/0289224 A1* | 11/2012 | Hallberg | ............. | H04W 52/223 455/424 |
| 2014/0199982 A1* | 7/2014 | Hahn | .................... | H04W 16/02 455/418 |
| 2014/0341188 A1* | 11/2014 | Chang | .................... | H04W 4/06 370/331 |
| 2015/0195800 A1* | 7/2015 | Zhu | ........................ | H04W 72/12 370/311 |
| 2015/0223198 A1* | 8/2015 | Du | .................... | H04W 52/0203 455/458 |

OTHER PUBLICATIONS

Prasad et al., Energy Efficient Small Cell Activation Mechanism for Heterogeneous Networks, IEEE GlobeCom 2013 Workshop, pp. 754-7590 (Year: 2013).*
Energy Efficient Small Cell Activation Mechanism for Heterogeneous Networks by Athul Prasad et al.; Globecom 2013 Workshop—Heterogeneous and Small Cell Networks—2013.
LTE; Evolved Universal Terrestrial Radio Access (E-UTRA); Potential Solutions for Energy Saving for E-UTRAN (3GPP TR 36.927 version 11.0.0 Release 11); ETSI TR 136 927 v11.0.0—Oct. 2012.
LTE; Evolved Universal Terrestrial Radio Access (E-UTRA) and Evolved Universal Terrestrial Radio Access Network (E-UTRAN); Overall Description; Stage 2 (3GPP TS 36.300 version 11.8.0 Release 11); ETSI TS 136 300 v11.8.0—Jan. 2014.
3GPP TSG-RAN WG3 Meeting #79bis; Chicago, IL USA; Source: Samsung; Title: Summary of the issues on the overlaid scenario for energy saving (R3-130778)—Apr. 15-19, 2013.
3GPP TSG-RAN WG3 Meeting #81; Barcelona, Spain; Title: Discussion on Solutions for LTE Coverage Layer Energy Saving; Source: CMCC, Samsung, CATT, LGE, NEC, Kyocera (R3-131373)—Aug. 19-23, 2013.
3GPP TSG-RAN WG3 #83; Prague, Czech Republic; Title: Need for QoS Information Exchange for Energy Savings; Source: NEC Corporation (R3-140214)—Feb. 10-14, 2014.
3GPP TSG-RAN WG3#83; Prague, Czech Republic; Source: Ericsson; Title: Evaluation of energy saving for switch on enhancement for overlaid scenarios (R3-140329)—Feb. 10-14, 2014.
3rd Generation Partnership Project; Technical Specification Group Radio Acess Network; Evolved Universal Terrestrial Radio Acess Network (E-UTRAN); X2 Application Protocol (X2AP) (Release 12); 3GPP TS 36.423 v12.0.0; Technical Specification—Dec. 2013.
PCT Notification of Transmittal of the International Search Report and the Written Opinion of the International Searching Authority, or the Declaration for International application No. PCT/SE2015/050304—dated Aug. 4, 2015.

* cited by examiner

METHOD OF CONTROLLING BOOSTER CELL ENERGY CONSUMPTION

PRIORITY

This nonprovisional application is a U.S. National Stage Filing under 35 U.S.C. § 371 of International Patent Application Serial No. PCT/SE2015/050304 filed Mar. 17, 2015, and entitled "A Method Of Controlling Booster Cell Energy Consumption" which claims priority to U.S. Provisional Patent Application No. 61/968,110 filed Mar. 20, 2014, both of which are hereby incorporated by reference in their entirety.

TECHNICAL FIELD

The present disclosure relates to a method, performed in a booster radio base station, booster RBS, defining a booster cell in a multi-layer cell structure, of controlling energy consumption. The disclosure also relates to a booster RBS.

Further, the present disclosure relates to a method, performed in a macro radio base station, macro RBS, defining a basic coverage providing macro cell, of controlling energy consumption of a booster radio base station. The disclosure also relates to a macro radio base station.

BACKGROUND

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. The Universal Terrestrial Radio Access Network, UTRAN, is the, RAN, Radio Access Network of a UMTS and Evolved UTRAN, E-UTRAN, is the RAN of an LTE system. The Evolved UMTS Terrestrial Radio Access Network (E-UTRAN) consists of base stations called enhanced NodeBs (eNBs or eNodeBs), providing the E-UTRA user plane and control plane protocol terminations towards the UE. The eNBs are interconnected with each other by means of the X2 interface. The eNBs are also connected by means of the S1 interface to the Evolved Packet Core, EPC.

A macro cell is a cell defined by a macro radio base station, e.g. an eNB, and providing a basic coverage in an area of a wireless communication system. E-UTRAN, UTRAN or GERAN cells are examples of basic coverage providing macro cells. A booster cell is a cell defined by a booster radio base station, booster RBS, and covering a subarea of the macro cell. Booster cells are typically used to increase the capacity of the macro cell by moving traffic from the macro cell to the booster cell. The macro RBS of the macro cell typically requires more energy to handle a UE compared to a booster RBS, defining the smaller booster cell. Hence it is often beneficial from an energy saving point of view to move UEs to smaller cells when such smaller cells are available.

A booster cell can be switched to an energy saving mode, e.g. when traffic is low in the booster cell and there is available capacity in the macro cell. One purpose of this is to reduce operational expenses through energy savings and to reduce environmental impact, e.g. the impact from $CO_2$ emissions. Thus, it is possible to optimize energy consumption by deactivating a booster cell providing additional capacity when its capacity is no longer needed and to re-activate the cell on a need basis.

When a booster cell is active it handles load which would otherwise be handled by a macro cell. In order to reduce the energy consumption, the booster RBS is capable of switching off the radio interface and activate a sleep mode for resources of the booster RBS. However, while the decision to activate a sleep mode for the booster RBS will reduce energy consumption in the booster RBS, the impact on the overall energy consumption could be insignificant and even negative since the macro RBS typically requires more energy to provide the same quality of service to a wireless device in the area of the booster cell as the booster RBS.

SUMMARY

There is a need for a solution whereby the overall energy consumption for radio traffic in the area of a booster cell can be considered in controlling energy consumption for a booster radio base station, RBS. In particular, there is also a need for a solution to determine when it becomes beneficial to activate an energy saving state for a booster RBS and let the traffic be handled by a basic coverage providing macro cell and to determine when it is energy efficient to re-activate a booster RBS from the energy saving state.

The disclosure presents a method performed in a booster radio base station, RBS, defining a booster cell in a multi-layer cell structure, of controlling energy consumption. The method comprises a step of receiving information from a macro RBS, defining a basic coverage providing macro cell, the information indicating a first power required to provide service to one or more wireless devices being served in an area at least in part overlapping the booster cell. The method also comprises the further steps of determining a macro bitrate power measure based on the received information, the macro bitrate power measure reflecting a service provisioning of the one or more wireless devices from the macro RBS and determining a booster bitrate power measure, the booster bitrate power measure reflecting a service provisioning of the one or more wireless devices from the booster RBS. An energy consumption state is selected from two or more energy consumption states for the booster RBS based on a comparison between the booster bitrate power measure and the macro bitrate power measure.

Thus, the disclosure presents improved selection and de-selection of a booster cell based on overall energy consumption thereby taking environmental and energy saving aspects into account. Using the disclosed method will provide improvements with regard to selection and activation of appropriate resources in a multilayer cell structure. Quality of service based power measures are used to provide a simple, robust and comparable measure of a power required to provide service to the wireless device from either a macro RBS or from a booster RBS. The disclosed method allows the basic coverage providing cell and booster cell to autonomously perform the activating and de-activating of a booster cell hence reducing the operational cost for the operator and simultaneously providing an improved ability to adapt to changes in UE behavior and changes in the network.

In accordance with an aspect of the disclosed method, a first energy consumption state corresponds to a normal operation of the booster RBS and a second energy consumption state is an energy saving state of the booster RBS. In accordance with another aspect of the disclosed method the selected energy consumption state is an energy saving state of the booster RBS. Thus, the present disclosure specifically addresses energy saving aspects by enabling selection of an energy saving state.

In accordance with yet another aspect of the disclosed method, the method further includes selecting the energy consumption state based on a comparison between a booster bitrate power measure and a macro bitrate power measure for all wireless devices served by the booster RBS. The quality of service based power measures for comparing service from a macro RBS to service from a booster RBS are easily obtainable for all wireless devices in the booster cell. Making a selection based on a comparison of such measures improves the accuracy of an energy consumption control decision.

In accordance with an aspect of the disclosed method, the energy saving state is selected when booster bitrate power measure exceeds the macro bitrate power measure. Consequently, the disclosure provides a solution wherein the booster RBS is put in an energy saving state when a connection between a booster RBS and a wireless device is less energy efficient than a corresponding connection between a macro RBS and the wireless device.

In accordance with an aspect of the disclosed method, in the step of determining the macro bitrate power measure based on the received information includes retrieving a bit rate.

In accordance with an aspect of the disclosed method, the method comprises a further step of, after the step of selecting, initiating a handover action in order to off load the booster RBS. Thus, the present disclosure also provides the advantage of enabling off-loading of the booster RBS following a decision to select an energy saving state for the booster RBS.

In accordance with an aspect of the disclosed method, the method comprises a further step of, after the step of initiating, transmitting information comprising a reason for handover to the macro RBS.

In accordance with an aspect of the disclosed method, the method further comprising a step of transmitting information about the lower energy consumption state to peer radio base stations over an X2 interface between booster RBS and the peer radio base stations. Thus, the present disclosure enables sharing of information on the energy saving state.

In accordance with an aspect of the disclosed method, the information indicating a required first power is received in a hand over request message from the macro RBS.

In accordance with an aspect of the disclosed method, the method comprises a further step of receiving a reactivating signal from the macro RBS.

In accordance with an aspect of the disclosed method, the method comprises a further step of receiving a minimum time indicating the minimum time before selecting an energy consumption state of the booster RBS.

In accordance with an aspect of the disclosed method, the information further comprises information on how the power is supplied to the macro RBS and wherein the step of selecting further is based on the information on how the power is supplied.

In accordance with an aspect of the disclosed method, the method further comprises a step of transmitting from the booster RBS to the macro RBS, in a handover request acknowledge message, information indicating that no further first power information is required.

In accordance with an aspect of the disclosed method, the step of determining the macro bitrate power is performed by measuring the bitrate power or retrieving the bitrate power from pre-configured values from a memory in the booster RBS.

The present disclosure also relates to embodiments of a booster radio base station, booster RBS, comprising a processor and a memory. The memory contains instructions executable by the processor. The booster RBS is operative to receive information from a macro radio base station, macro RBS, defining a basic coverage providing macro cell, the information indicating a required first power to provide service to a wireless device being served in an area at least in part overlapping the booster cell. The booster RBS is further operative to determine a macro bitrate power measure based on the received required first power, the macro bitrate power measure reflecting a service provisioning of the wireless device from the macro RBS and to determine a booster bitrate power measure, the booster bitrate power measure reflecting a service provisioning of the wireless device from the booster RBS. The booster RBS is also operative to select an energy consumption state of the booster RBS based on a comparison of the macro bitrate power measure and the booster bitrate power measure.

The present disclosure also presents a computer readable storage medium, having stored thereon a computer program which, when run in a booster RBS causes the booster RBS to perform the disclosed method.

The disclosure presents a method performed in a macro radio base station, macro RBS, defining a basic coverage providing macro cell, of controlling energy consumption of a booster radio base station, booster RBS. The method comprises a step of determining a macro bitrate power measure indicating required first power to provide service to a wireless device being served by the macro RBS in an area, at least in part, overlapping one or more cells defined by respective booster RBSs. The method also comprises the step of estimating booster bitrate power measures, each booster bitrate power measure reflecting a service provisioning of the wireless device from the respective booster RBS. A wake up signal is sent to one of the booster RBSs based on a comparison of the macro bitrate power measure and the different booster bitrate power measures. Thus, the disclosure also provides for re-activating a booster RBS, when the booster RBS is in an energy saving state so that the overall energy efficiency of a multi-layer cell deployment is taken into consideration.

According to an aspect of the disclosure, the macro RBS performs a step of transmitting information from the macro RBS to the booster RBS indicating a required first power to provide service by the macro RBS to a wireless device being served by the booster RBS in an area, at least in part overlapping, the booster cell. Thus, the disclosure provides for transmitting information to activated booster RBSs to enable determining of a macro bitrate power measure in the booster RBS.

The present disclosure relates to embodiments of a macro radio base station, macro RBS, operative to control energy consumption of a booster radio base station, booster RBS, the macro RBS comprising a processor and a memory containing instructions executable by the processor whereby the macro RBS is operative to determine a macro bitrate power measure indicating required first power to provide service to a wireless device being served by the macro radio base station, in an area at least in part overlapping one or more cells defined by respective booster RBSs. The macro RBS is further operative to estimate booster bitrate power measures, each respective booster bitrate power measure reflecting a service provisioning of the wireless device from the different booster RBS. Furthermore, the macro RBS is operative to send a wake up signal to one of the booster RBSs based on a comparison of the macro bitrate power measure and the different booster bitrate power measures.

The present disclosure also presents a computer readable storage medium, having stored thereon a computer program which, when run in a macro RBS causes the macro RBS to perform the above disclosed method.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Aspects of the present disclosure will be described more fully hereinafter with reference to the accompanying drawings. The methods and wireless device disclosed herein can, however, be realized in many different forms and should not be construed as being limited to the aspects set forth herein. Like numbers in the drawings refer to like elements throughout.

The general object or idea of embodiments of the present disclosure is to address at least one or some of the disadvantages with the prior art solutions described above as well as below. The various steps described below in connection with the figures should be primarily understood in a logical sense, while each step may involve the communication of one or more specific messages depending on the implementation and protocols used.

The terminology used herein is for the purpose of describing particular aspects of the disclosure only, and is not intended to limit the disclosure to any particular embodiment. As used herein, the singular forms "a", "an" and "the" are intended to include the plural forms as well, unless the context clearly indicates otherwise.

It is an object of the present disclosure to provide embodiments solving the problem of how the macro RBS should determine when it is energy efficient to activate a booster cell and move traffic to the booster cell compared to continue serving traffic on the basic coverage providing macro cell. Another object of the present disclosure to provide embodiments solving the problem of how the booster RBS should determine when it becomes beneficial to put the booster cell in the energy saving state and let the traffic be handled by the basic coverage providing macro cell.

According to an aspect of the present disclosure, information indicating the required power by the macro cell to provide a specific bitrate in the area where the booster cell is located is provided to the booster RBS. The booster RBS cell knows its energy consumption, e.g. by configuration or measurements, and can estimate when it would be beneficial to enter an energy saving mode and let the macro cell handle the UEs, i.e. considering bitrates of all UEs served by the booster RBS in a consideration on an energy saving state.

A concept involves a mechanism for a booster RBS to estimate at which bitrates it is energy efficient to exit active mode and enter energy saving state from an energy saving perspective.

Figure 1:
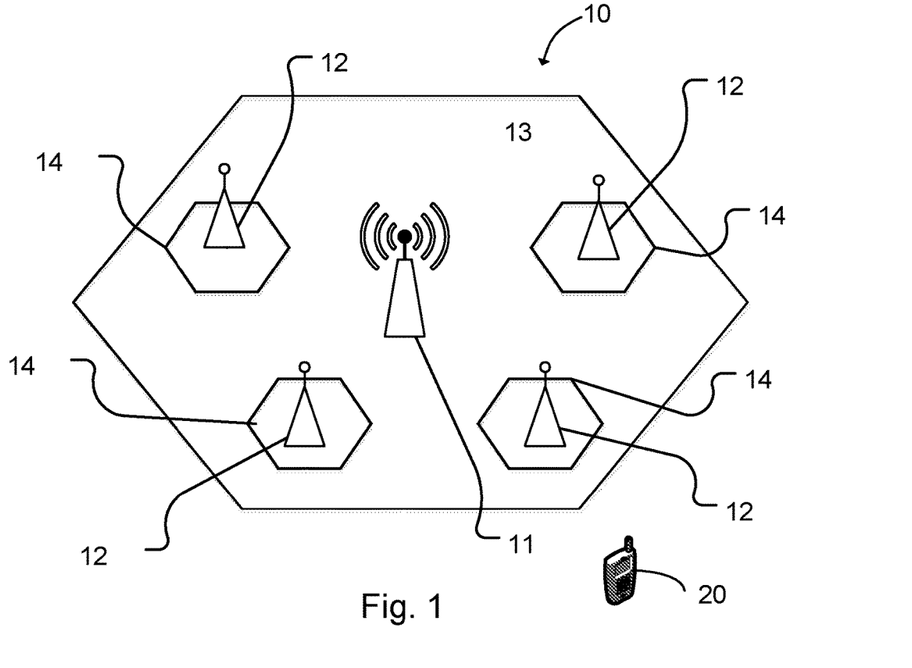
FIG. 1 schematically illustrates a multi-layer cell structure communication network in which exemplary embodiments of the present disclosure can be implemented.

FIG. 1 schematically illustrates a multi-layer cell structure communication network 1, in which aspects of the present disclosure can be implemented. In this multi-layer cell structure communication network 1, a macro RBS 11 defines a basic coverage providing macro cell 13 with a larger coverage area. FIG. 1 also discloses a plurality of booster RBSs 12 that each define a respective booster cell 14 having a smaller coverage area than the macro cell 13. The booster cells are, at least in part, provided in the area of the macro RBS, so that a multilayer structure is provided. The booster cells 14 reduce demands on the macro cell 11 while at the same time providing additional traffic capacity. Although the booster cells 14 provide several benefits as mentioned, during periods of low traffic operation of a booster RBS 14 also implies additional power usage as compared to that required by the macro RBS 11 alone while the operative of the booster RBS may be insignificant. Therefore, there is a need for techniques to allow the booster cells 14 to turn off during periods of low usage. In FIG. 1, there are four booster cells 14 within a coverage area of a macro cell 11.

According to an aspect of the present disclosure the energy consumption for the booster RBS and the macro RBS is proportional to cell size. In the following discussion, this will be discussed as energy consumption for a cell, but obviously the energy consumption is in the RBS defining the corresponding cell.

Figure 2:
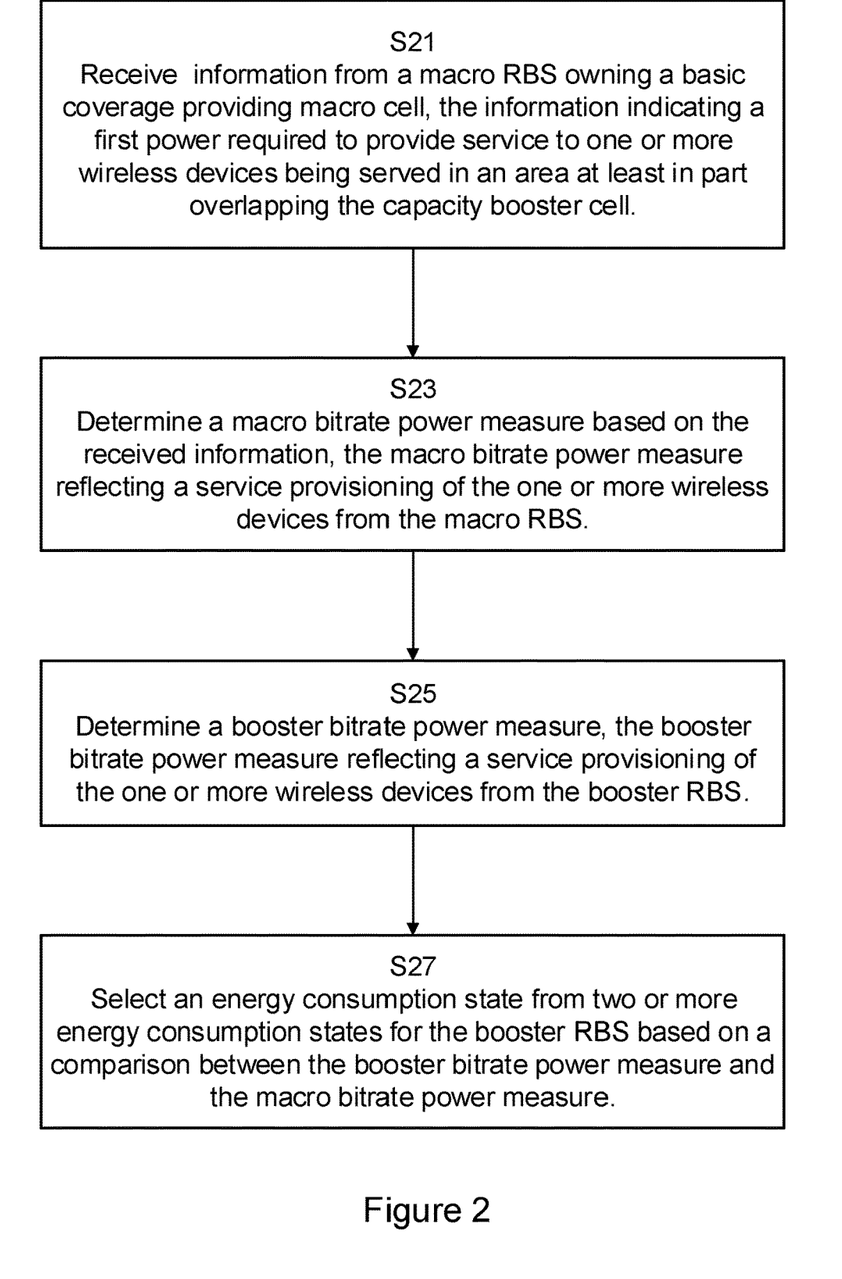
FIG. 2 is a flow chart illustrating an example of method embodiments performed in a booster RBS.

FIG. 2 illustrates a method, performed in a booster RBS, for controlling energy consumption. The booster RBS is arranged to serve wireless devices in a booster cell, at least in part overlapping the area of a macro cell defined by a corresponding macro RBS. The booster cell and macro cell are part of a multilayer structure in the wireless network. In its broadest context, the method comprises a sequence of steps or operations to select between at least two differing energy consumption states for the booster RBS, based on a comparison of the energy consumption for serving a wireless device from a macro RBS and an energy consumption for serving the wireless device from a booster RBS. The comparison is performed between a macro bitrate power measure and at least one booster bitrate power measure. The method comprises a step of receiving S21 information from a macro RBS, defining a basic coverage providing macro cell, the information indicating a first power required to provide service to one or more wireless devices being served in an area at least in part overlapping the booster cell. The method also comprises the further steps of determining S23 a macro bitrate power measure based on the received information, the macro bitrate power measure reflecting a service provisioning of the one or more wireless devices from the macro RBS and determining S25 a booster bitrate power measure, the booster bitrate power measure reflecting a service provisioning of the one or more wireless devices from the booster RBS. As mentioned, the energy consumption state is selected S27 from two or more energy consumption states for the booster RBS based on a comparison.

In the comparison the booster bitrate power measure is compared to the macro bitrate power measure.

Figure 3:
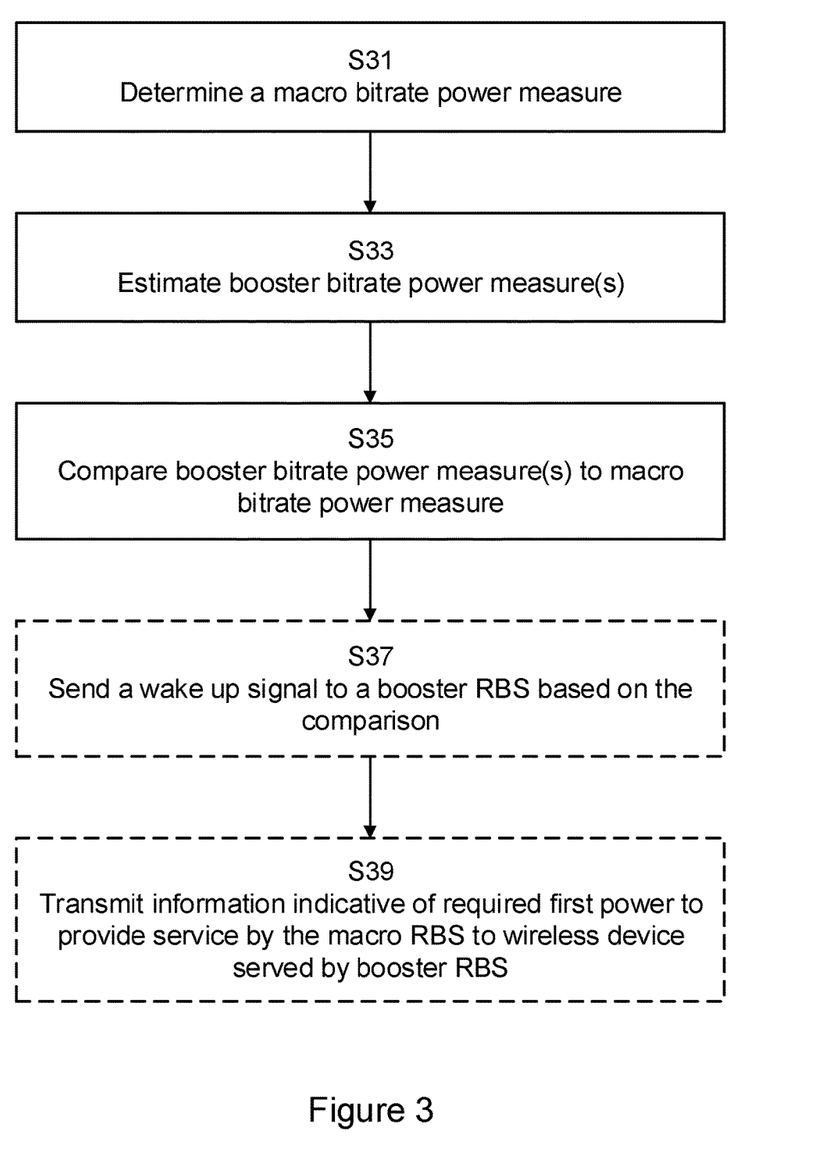
FIG. 3 is a flow chart illustrating an example of method embodiments performed in a macro RBS.

FIG. 3 illustrates example operations, performed in a macro RBS, for controlling energy consumption. In its broadest context, the method comprises a sequence of steps or operations to activate a booster RBS based on a comparison of the energy consumption for serving a wireless device from a booster RBS and the energy consumption for providing the service from the macro RBS. The method comprises a step of determining S31 a macro bitrate power measure indicating required power to provide service to a wireless device being served by the macro RBS in an area at least in part overlapping a cell defined by a booster RBS. The method also comprises the further steps of estimating S33 one or more booster bitrate power measures reflecting a service provisioning of the wireless device from respective booster RBSs and comparing S35 the booster bitrate power measures to a macro bitrate power measure. Based on the comparison, the macro RBS sends S37 a wake up signal to the booster RBS based on the comparison.

For a booster RBS being in an active state, operations performed in a macro RBS also comprises transmitting information to the booster RBS indicating a required first power to provide service by the macro RBS to a wireless device being served by the booster RBS, in an area at least in part overlapping the capacity booster cell.

A macro RBS of a macro cell or a booster RBS of a booster cell send reference signals setting a minimum power consumption required by an active cell. When UEs connects to the macro RBS or booster RBS, there is an increased power consumption, the magnitude of which depends on the required resources. The power consumption can be modeled as the constant, minimum power consumption required by the active cell plus available consumption depending on the required resources. In the expression below, the variable consumption is expressed based on a relative output power of the cell in percent; in the example below $P_c$ denotes an output power of the macro RBS and $P_b$ an output power of a booster cell.

$$P_c(x) = k_c * x + m_c\ x: \text{Relative output power [\%]}$$

$$P_b(x) = k_b * x + m_b\ x: \text{Relative output power [\%]}$$

The power consumption is correlated to the bitrate, and can be perceived as a bitrate dependent power measure, hereafter presented as a bitrate power measure. The higher the bitrate the more power is needed.

The macro cell is always active, hence the extra power required to serve a wireless device with certain bitrate consuming x1 relative output power from the macro RBS is:

$$P_c(x+x1) - P_c(x) = k_c*(x+x1) + m_c - (k_c*x + m_c) = k_c*x1$$

which represents a macro bitrate power measure. Retrieving the bitrate of the one or more wireless devices, the measure may in be expressed in terms of macro energy per bit or macro power per bit, In the following disclosure a macro power measure correlated to the bitrate, here denominated macro bitrate power measure, will be discussed in relation to the operations for controlling energy consumption in a booster RBS.

If there is a booster RBS in an active mode, the macro RBS provides information of the power required to provide a corresponding service from the macro RBS, i.e. to provide a corresponding bitrate to the wireless device, by transmitting the information to the booster RBS, as illustrated in step S39 in FIG. 3. Such information may be included in a modified handover request message as illustrated further down. The information is received in the booster RBS as illustrated in step S21 in FIG. 2.

If there is a booster cell in energy saving mode in the coverage area of the macro cell the increase when waking up the booster RBS and serving the UE becomes:

$$P_b(x11) = k_b*x11 + m_b.$$

which represents a booster bitrate power measure. Retrieving the bitrate of the one or more wireless devices, the measure may in fact be expressed in terms of energy per bit, or power per bit. However the present disclosure is not limited to such a representation of the measure relating to booster RBS service. The measure could also be a power level measure, as exemplified.

The relative output power will normally not be the same on the booster cell and becomes x11 instead of x1.

An energy consumption state of the booster RBS, e.g. a first energy consumption state corresponding to a normal operation of the booster RBS and a second energy consumption state corresponding to an energy saving state of the booster is selected based on a comparison between an increase of power in the macro cell caused by deactivating the booster cell compared to a decrease of power caused by the deactivating of the booster cell. According to an aspect of the disclosure, the selected energy consumption state is an energy saving state of the booster RBS.

Activation of the booster cell is beneficial from an energy saving point of view if the reduction in power in the macro cell is larger than the increase in power required by the booster cell. Thus, the energy saving state is abandoned when the macro bitrate power measure exceeds the booster bitrate power measure.

$$P_c(x+x1) - P_c(x) > P_b(x11)$$

Deactivation of the booster cell becomes beneficial from an energy saving point of view if $$P_c(x+x1) - P_c(x) < P_b(x11)$$

The energy saving state is selected when the booster bitrate power measure exceeds the macro bitrate power measure. The relative output power is correlated to the bitrate. The higher the bitrate the more power is needed. According to an aspect of the disclosure, the information indicating a first power level comprises a bit rate of wireless device communication so that the step of determining the macro bitrate power measure includes retrieving a bit rate. Further, the required power in an area depends on the radio environment and varies in the network.

In the example presented above, the selecting of an energy consumption state was performed based on a bitrate power measure for one wireless device served by a macro RBS or a booster RBS. However, the disclosed method is of course equally applicable for a plurality of wireless devices. Preferably, the method is performed for all wireless devices served by the booster RBS performing the method.

Since a higher bitrate also implies a higher throughput and improved data communication performance, there is a need to take the bitrates into consideration when considering the energy efficiency. Thus, when the booster RBS shall decide if it is energy efficient to enter dormant mode, a macro bitrate power measure representing the output power needed by the macro cell to provide the same bitrate from the booster cell is approximated.

As mentioned, the relative output power is correlated to the bitrate. The relative output power needed by the macro RBS to provide the same bitrate as a booster cell $$P_{cov}(x) = k_{env}*x.$$

With the information above the booster RBS estimates a threshold where the total power consumption in the macro cell and booster cell is minimized when the booster RBS is in a dormant mode.

$$P_{booster}(x) < k_{env} * x$$

$P_{booster}$ is derivable in the booster RBS. The estimation of the threshold is based on knowledge of the $k_{env}$ parameter. This $k_{env}$ parameter could be configured in the booster cell but would require the operator to go to each booster cell and make an estimate of this value for each coverage-booster cell pair. Such static configuration would not easily be updated with correct values when the radio environment changes which as an example could be new buildings. The parameter can also be autonomously estimated in the booster RBS with assistance from the macro RBS when the macro provides the power used for a specific bitrate in the area covered by the booster cell.

Figure 4:
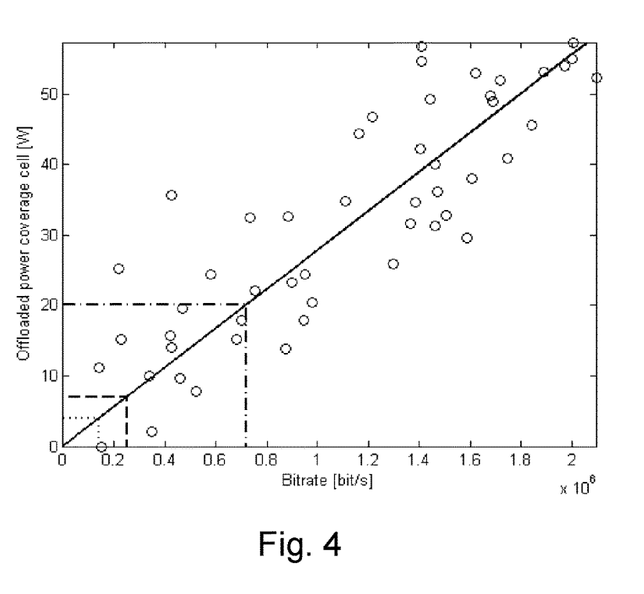
FIG. 4 is a diagram illustrating examples of bitrate correlated power measures.

Turning back to FIG. 3, operations for re-activating the booster RBS are presented. The re-activating is performed by the macro RBS sending a reactivating signal to the booster RBS, and receiving the reactivating signal in the booster RBS. FIG. 4 shows bitrate correlated power measures. Each ring 'o' indicates a received, in the booster RBS, measure of the power used by the macro cell for a specific bitrate, i.e. a macro bitrate power measure. Using a model, for instance a straight line as used in this example (corresponding to the $P_{booster} = k_{env} * x$ model), the booster cell can estimate the power that would have been used in macro cell to provide a specific bitrate. If the booster cell consumes 4 W more in active mode compared to energy saving mode for a specific bitrate it would be advantageous to enter energy saving mode when the total average bitrate is below 0.14 Mbit as illustrated by the dotted line where it intersects with the x-axle. The other lines show that if the booster cell consumes more energy (7 W and 20 W respectively) it is beneficial from an energy saving perspective at higher bitrates. Other models than straight line approximation could be used especially if the coverage cell additionally takes power consumption for a UE when no data is provided into account. The method of estimation could be but not limited to least square algorithm, recursive least squares algorithm, Kalman filters or other mechanisms.

According to an aspect of the present disclosure, a booster RBS can automatically estimate the threshold where it is beneficial to switch the booster RBS to another energy consumption state in order to save energy. The algorithm accounts for radio conditions, power dependence to load in the macro cell. Further, in case the radio conditions changes due to a change in the environment the algorithm can be designed to follow such changes by forgetting old data. This type of behavior can be provided using for instance a sliding window, recursive algorithms or using a model where the parameters are modeled to change slowly where Kalman filter is one example of the possible options. To speed up the algorithm in case there is a change in the radio environment change detection algorithms may also be used which provide further mechanisms to improve the stability of the estimated parameters but also be able to quickly adapt to a change when detected. An example of a change detection algorithm is the CUSUM algorithm.

According to another aspect of the disclosure, a booster RBS initiates handover action in order to off-load the booster RBS prior when the energy saving state has been determined to represent a beneficial power consumption state of the booster RBS. The handover action includes transmitting a handover request message to the macro RBS, wherein the handover request message may comprise information on the reason for handover.

In E-UTRAN the invention could be implemented on for instance the X2 protocol during handover. The minimum amount of information that then needs to be added is the estimated power consumption for the wireless device when served by the coverage providing cell close to where a handover is performed. If all bearers are accepted on the target side, the receiving cell, the booster RBS can estimate the bitrate by monitoring the traffic. Additionally the bitrate estimated by the macro cell could be added which would make the booster RBS less complex since it would not need to estimate the bitrate.

An alternative solution could be for the macro RBS to signal measurement results such as RSRP and/or RSRQ for the booster RBS in the handover request message. This would give an estimate of the path loss between the macro RBS and UE in the location of the booster cell. Assuming that the booster RBS is aware of its own power consumption and also aware of the macro cells increase in power consumption for a particular bit rate it can estimate when it would be advantageous to enter another energy consumption state. The power/bitrate in the macro cell could either be configured in the booster RBS or exchanged over an interface which could be the X2 interface in E-UTRAN. The X2 Setup Request procedure would be one message which could carry this information.

The below table 1 shows how a handover request message that is sent by the macro RBS to the booster RBS can be modified.

| IE/Group Name | Presence | Range | IE type and reference | Semantics description | Criticality | Assigned Criticality |
|---|---|---|---|---|---|---|
| UE Power consumption | O | | INTEGER(0 . . . 10000) | UE power consumption in the macro cell in W. Scaling 1/1000. | YES | Ignore |
| Power differentiation weight | O | | INTEGER(0 . . . 100) | Weight factor to differentiate between how power is supplied to the eNB. | YES | Ignore |

Turning now to FIG. 4, a schematic diagram is disclosed illustrating an exemplary embodiment of a booster RBS50.

Figure 5:
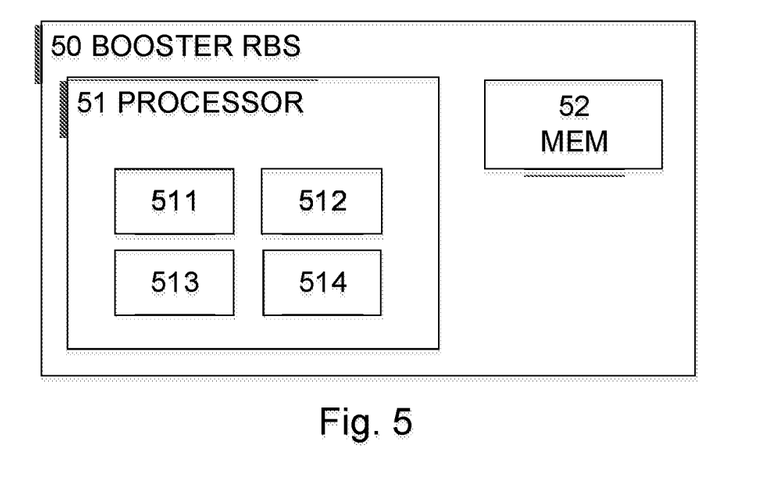
FIG. 5 is a schematic diagram illustrating a booster RBS according to an exemplary embodiment of the present disclosure.

The booster RBS 50 comprises a processor 51 and a memory 52, the memory 52 containing instructions executable by the processor 51. The processor 51 is a Central Processing Unit, CPU, microcontroller, Digital Signal Processor, DSP, or any other suitable type of processor capable of executing computer program code. The memory 52 is a Random Access Memory, RAM, a Read Only Memory, ROM, or a persistent storage, e.g. a single or combination of magnetic memory, optical memory, or solid state memory or even remotely mounted memory.

According to one aspect, the disclosure further relates to the above mentioned computer program, comprising computer readable code which, when run on the booster RBS 50 causes the booster RBS 50 to perform any of the aspects of the method described above.

When the above-mentioned computer program code is run in the processor 51 of the booster RBS 50 it causes the booster RBS 50 to receive information from a macro RBS, the information indicating a required first power to provide service to a wireless device being served by the booster RBS 50, in an area at least in part overlapping the capacity booster cell. The computer program further causes the booster RBS 50 to determine a macro bitrate power measure based on the received required first power, the macro bitrate power measure reflecting a service provisioning of the wireless device from the macro RBS. The computer program yet further causes booster RBS 50 to determine a booster bitrate power measure reflecting a service provisioning of the wireless device from the booster RBS. The computer program also causes the booster RBS 50 to compare the macro bitrate power measure and the booster bitrate power measure and to select an energy consumption state of the booster RBS based on the comparison.

According to one aspect of the disclosure the processor 51 comprises one or several of:
- a receiver module 511 adapted to receive information from a macro RBS, the information indicating a required first power to provide service to a wireless device being served in an area at least in part overlapping the capacity booster cell;
- a determining module 512 adapted to determine a macro bitrate power measure based on the received required first power, the macro bitrate power measure reflecting a service provisioning of the wireless device from the macro RBS and to determine a booster bitrate power measure, the booster bitrate power measure reflecting a service provisioning of the wireless device from the booster RBS;
- a comparator module 513 adapted to compare the macro bitrate power measure and the booster bitrate power measure; and
- a selection module 514 adapted to select an energy consumption state of the booster RBS based on the comparison.

The receiver module 511, the determining module 512, the comparator module 513 and the selection module 514 are implemented in hardware or in software or in a combination thereof. The modules 511, 512, 513 and 514 are according to one aspect implemented as a computer program stored in the memory 52 which run on the processing circuitry 51. The booster RBS 50 is further configured to implement all the aspects of the disclosure as described in relation to the methods above.

Figure 6:
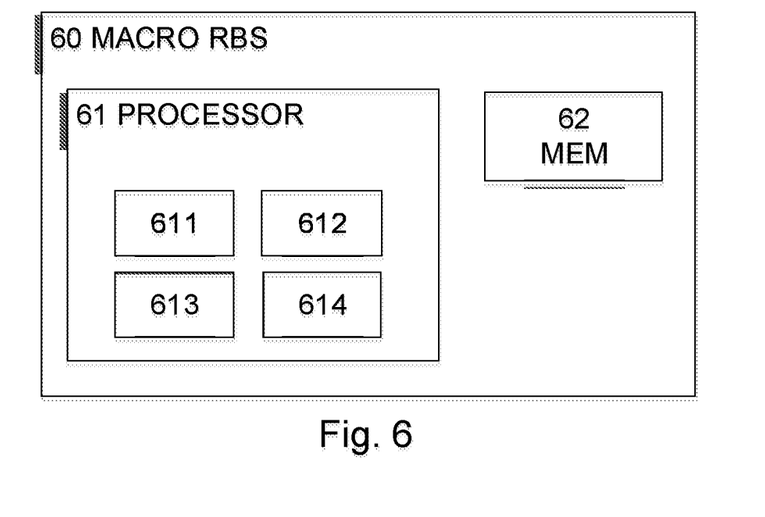
FIG. 6 is a schematic diagram illustrating a macro RBS according to an exemplary embodiment of the present disclosure.

Turning now to FIG. 6, a schematic diagram is disclosed illustrating an exemplary embodiment of a macro RBS 60. The macro RBS 60 comprises a processor 61 and a memory 62, the memory 62 containing instructions executable by the processor 61. The processor 61 is a Central Processing Unit, CPU, microcontroller, Digital Signal Processor, DSP, or any other suitable type of processor capable of executing computer program code. The memory 62 is a Random Access Memory, RAM, a Read Only Memory, ROM, or a persistent storage, e.g. a single or combination of magnetic memory, optical memory, or solid state memory or even remotely mounted memory.

According to one aspect, the disclosure further relates to the above mentioned computer program, comprising computer readable code which, when run on the macro RBS 61 causes a booster RBS to perform any of the aspects of the method described above.

When the above-mentioned computer program code is run in the processor 61 of the macro RBS 60 it causes the macro RBS 60 to receive information from different booster RBS, the information indicating required power to provide service to a wireless device being served by the macro RBS 60, in an area at least in part overlapping by the different booster RBS. The computer program further causes the macro RBS 60 to determine different booster bitrate power measures, the booster bitrate power measures reflecting service provisions of the wireless device from the different booster RBS. The computer program yet further causes the macro RBS 60 to compare the different booster bitrate power measures; and send a wake up signal to one of the booster RBSs based on the comparison According to another aspect of the present disclosure, when the above-mentioned computer program code is run in the processor 61 of the macro RBS 60 it causes the macro RBS 60 to transmit information from the macro RBS 60 to the booster RBS indicating a required first power to provide service by the macro RBS 60 to a wireless device being served by the booster RBS, in an area at least in part overlapping the capacity booster cell.

According to one aspect, the disclosure further relates to the above mentioned computer program, comprising computer readable code which, when run on the macro RBS60, causes the macro RBS 60 to perform any of the aspects of the method described above.

According to one aspect of the disclosure the processor 61 comprises one or several of:
- a receiver module 611 adapted to receive information from different booster RBS, the information indicating required power to provide service to a wireless device being served by the macro radio base station, in an area at least in part overlapping one or more booster cells defined by respective booster RBS;
- a determining module 612 adapted to determine one or more booster bitrate power measures, each booster bitrate power measure reflecting a service provisions of the wireless device from a respective booster;
- a comparator module 613 adapted to compare the different booster bitrate power measures and the macro bitrate power measure; and
- a transmission module 614 adapted to send a wake up signal to a booster RBSs based on the comparison.

The receiver module 611, the determining module 612, the comparator module 613 and the transmission module 614 are implemented in hardware or in software or in a combination thereof. The modules 611, 612, 613, and 614 are according to one aspect implemented as a computer program stored in the memory 62 which run on the processing circuitry 61. The macro RBS 60 is further configured to implement all the aspects of the disclosure as described in relation to the methods above.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A method, performed in a booster radio base station, booster RBS, defining a booster cell in a multilayer cell structure, of controlling energy consumption in the booster RBS, the method comprising:
   receiving information from a macro RBS defining a basic coverage providing macro cell, the information indicating a first power required to provide service to one or more wireless devices being served in an area at least in part overlapping the capacity booster cell;
   determining a macro bitrate power measure based on the received information, the macro bitrate power measure reflecting a service provisioning of the one or more wireless devices from the macro RBS;
   determining a booster bitrate power measure, the booster bitrate power measure reflecting a service provisioning of the one or more wireless devices from the booster RBS; and
   selecting an energy consumption state from two or more energy consumption states for the booster RBS based on a comparison between the booster bitrate power measure and the macro bitrate power measure; and
   operating the booster RBS in the energy consumption state selected by the booster RBS;
   wherein determining the macro bitrate power measure based on the received information comprises retrieving a bit rate of the one or more wireless devices; and
   wherein the method further comprises:
      with assistance from the macro RBS, determining an updated power per bitrate value of the macro RBS in the area at least in part overlapping the booster RBS, wherein the updated power per bitrate value indicates a change in the radio environment proximate the booster RBS;
      adjusting the determined macro bitrate power measure using the updated power per bitrate value determined by the booster RBS; and
      after adjusting the macro bitrate power measure, selecting the energy consumption state based on a comparison between the booster bitrate power measure and the adjusted macro bitrate power measure.

2. The method according to claim 1, wherein a first energy consumption state corresponds to a normal operation of the booster RBS and a second energy consumption state is an energy saving state of the booster RBS.

3. The method according to claim 1, wherein the selected energy consumption state is an energy saving state of the booster RBS.

4. The method according to claim 1, further including selecting the energy consumption state based on a comparison between a booster bitrate power measure and a macro bitrate power measure for all wireless devices served by the booster RBS.

5. The method according to claim 3, wherein the energy saving state is selected when booster bitrate power measure exceeds the macro bitrate power measure.

6. The method according to claim 1, comprising a further step of, after the step of selecting, initiating a handover action in order to off-load the booster RBS.

7. The method according to claim 6, comprising a further step of, after the step of initiating, transmitting information comprising a reason for handover to the macro RBS.

8. The method according to claim 1, further comprising a step of transmitting information about the lower energy consumption state to peer radio base stations over an X2 interface between the booster RBS and the peer radio base stations.

9. The method according to claim 1, wherein the information indicating a required first power is received in a hand over request message from the macro RBS.

10. The method according to claim 1, wherein the method comprising a further step of receiving a reactivating signal from the macro RBS.

11. The method according to claim 1, wherein the method comprises a further step of receiving a minimum time indicating the minimum time before selecting an energy consumption state of the booster RBS.

12. The method according to claim 1, wherein the method further comprises a step of transmitting from the booster RBS to the macro RBS, in a handover request acknowledge message, information indicating that no further first power information is required.

13. The method according to claim 1, wherein the step of determining the macro bitrate power measure is performed by measuring the macro bitrate power measure or retrieving the macro bitrate power measure from pre-configured values from a memory in the booster RBS.

14. A non-transitory computer-readable storage medium, having stored thereon a computer program which, when run in a booster radio base station, causes the booster RBS to perform the method as disclosed in claim 1.

15. A booster radio base station, booster RBS, operative to control energy consumption, the booster RBS comprising a processor and a memory containing instructions executable by said processor whereby the booster RBS is operative to:
   receive information from a macro radio base station (macro RBS), the macro RBS defining a basic coverage providing macro cell, the information indicating a required first power to provide service to a wireless device being served in an area at least in part overlapping the capacity booster cell;
determine a macro bitrate power measure based on the received required first power, the macro bitrate power measure reflecting a service provisioning of the wireless device from the macro RBS;
determine a booster bitrate power measure, the booster bitrate power measure reflecting a service provisioning of the wireless device from the booster RBS;
select an energy consumption state of the booster RBS based on a comparison between the macro bitrate power measure and the booster bitrate power measure; and
operate the booster RBS in the energy consumption state selected by the booster RBS;
wherein the booster RBS operative to determine the macro bitrate power measure based on the received information comprises the booster RBS operative to retrieve a bit rate of the wireless device; and
wherein the booster RBS is further operative to:
with assistance from the macro RBS, determine an updated power per bitrate value of the macro RBS in the area at least in part overlapping the booster RBS, wherein the updated power per bitrate value indicates a change in the radio environment proximate the booster RBS;
adjust the determined macro bitrate power measure using the updated power per bitrate value determined by the booster RBS; and
after adjusting the macro bitrate power measure, select the energy consumption state based on a comparison between the booster bitrate power measure and the adjusted macro bitrate power measure.

16. A non-transitory computer-readable storage medium, having stored there on a computer program which, when run in a booster radio base station (booster RBS) defining a capacity booster cell in a multi-layer cell structure, causes the booster RBS to perform the method as disclosed in claim 15.

17. A method, performed in a macro radio base station, macro RBS, defining a basic coverage providing macro cell, of controlling energy consumption of a booster radio base station, booster RBS, the method comprising:
determining a macro bitrate power measure indicating required power to provide service to a wireless device being served by the macro RBS in an area at least in part overlapping the cells defined by the respective booster RBSs;
estimating booster bitrate power measures, each respective booster bitrate power measure reflecting a service provisioning of the wireless device from the respective booster RBS;
comparing the different booster bitrate power measures and the macro bitrate power measure;
sending a wake up signal to one of the booster RBSs based on the comparison; and
transmitting information from the macro RBS to the booster RBS indicating a required first power to provide service by the macro RBS to a wireless device being served by the booster RBS, in an area at least in part overlapping the capacity booster cell;
wherein:
the transmitted information indicating the required first power to provide service by the macro RBS is used by the booster RBS to select an energy consumption state from two or more energy consumption states for the booster RBS based on a comparison between the booster bitrate power measure and the macro bitrate power measure; and
determining the macro bitrate power measure based on the received information comprises retrieving a bit rate of the wireless device;
wherein the method further comprises:
transmitting information from the macro RBS to the booster RBS indicating a required second power to provide service by the macro RBS to a wireless device being served by the booster RBS, in an area at least in part overlapping the capacity booster cell, wherein the required second power is based on a determined updated power per bitrate value; and
determining the updated power per bitrate value of the macro RBS in the area at least in part overlapping the booster RBS, wherein the updated power per bitrate value indicates a change in the radio environment proximate the booster RBS; and
wherein the transmitted required second power is used by the booster RBS to select the energy consumption state from the two or more energy consumption states based on a comparison between the booster bitrate power measure and a macro bitrate power measure based on the required second power.

18. A macro radio base station, macro RBS, operative to control energy consumption of a booster radio base station, booster RBS, the macro RBS comprising a processor and a memory containing instructions executable by said processor whereby the macro RBS is operative to:
determine a macro bitrate power measure indicating required power to provide service to a wireless device being served by the macro RBS in an area at least in part overlapping one or more cells defined by respective booster RBSs;
estimate booster bitrate power measures, each respective booster bitrate power measure reflecting a service provisioning of the wireless device from a respective booster RBS;
compare the different booster bitrate power measures and the macro bitrate power measure;
send a wake up signal to one of the booster RBSs based on the comparison; and
transmit information from the macro RBS to the booster RBS indicating a required first power to provide service by the macro RBS to a wireless device being served by the booster RBS, in an area at least in part overlapping the capacity booster cell;
wherein:
the transmitted information indicating the required first power to provide service by the macro RBS is used by the booster RBS to select an energy consumption state from two or more energy consumption states for the booster RBS based on a comparison between the booster bitrate power measure and the macro bitrate power measure; and
the macro RBS is operative to determine the macro bitrate power measure based on the received information comprises the macro RBS is operative to retrieve a bit rate of the wireless device;
wherein the macro RBS is further configured to:
transmit information from the macro RBS to the booster RBS indicating a required second power to provide service by the macro RBS to a wireless device being served by the booster RBS, in an area at least in part overlapping the capacity booster cell, wherein the required second power is based on a determined updated power per bitrate value; and determine the updated power per bitrate value of the macro RBS in the area at least in part overlapping the booster RBS, wherein the updated power per bitrate value indicates a change in the radio environment proximate the booster RBS;

wherein the transmitted required second power is used by the booster RBS to select the energy consumption state from the two or more energy consumption states based on a comparison between the booster bitrate power measure and a macro bitrate power measure based on the required second power.

* * * * *